(12) United States Patent
Conrad et al.

(10) Patent No.: US 7,627,217 B2
(45) Date of Patent: Dec. 1, 2009

(54) FIBER OPTIC CABLES HAVING A TONING LOBE

(75) Inventors: Craig M. Conrad, Hickory, NC (US); Eric A. Stern, Winston-Salem, NC (US)

(73) Assignee: Corning Cable Systems LLC, Hickory, NC (US)

( * ) Notice: Subject to any disclaimer, the term of this patent is extended or adjusted under 35 U.S.C. 154(b) by 58 days.

(21) Appl. No.: 11/365,443

(22) Filed: Feb. 28, 2006

(65) Prior Publication Data

US 2007/0201799 A1    Aug. 30, 2007

(51) Int. Cl.
*G02B 6/44* (2006.01)
*H01B 11/22* (2006.01)
(52) U.S. Cl. .................. 385/101; 385/113; 174/113 AS
(58) Field of Classification Search .................. 385/101, 385/113; 174/113 AS, 117 AS
See application file for complete search history.

(56) References Cited

U.S. PATENT DOCUMENTS

| | | | |
|---|---|---|---|
| 2,232,085 A | 2/1941 | Troche | |
| 4,638,117 A | 1/1987 | Ney ........................... 174/117 |
| 5,342,991 A | 8/1994 | Xu et al. ...................... 174/117 |
| 5,678,609 A | 10/1997 | Washburn .................... 138/107 |
| 6,687,437 B1 * | 2/2004 | Starnes et al. ................ 385/101 |
| 6,734,364 B2 | 5/2004 | Price et al. ................... 174/117 |
| 6,862,390 B2 | 3/2005 | Tanaka et al. ................ 385/113 |
| 2006/0029340 A1 * | 2/2006 | Andrews et al. ............ 385/100 |

OTHER PUBLICATIONS

United States Patent Application 2005/0053342A1, Mar. 10, 2005. "Prior Art", admitted date of Aug. 2005.

* cited by examiner

*Primary Examiner*—Jerry T Rahll
(74) *Attorney, Agent, or Firm*—C. Keith Montgomery

(57) ABSTRACT

Fiber optic cables are disclosed that have a toning lobe that allows the conductive wire to migrate toward the main cable body while still allowing adequate separation performance of the toning lobe. More specifically, the fiber optic cable includes a main cable body having at least one optical waveguide and a toning lobe. The toning lobe is connected to the main cable body by a web that frangible. In one embodiment, the toning lobe and the web have a generally tear drop shape. The web includes a neck portion adjacent to the main cable body and a web body, wherein the web body generally increases in thickness towards the toning lobe. The shape of the toning lobe allows a conductive wire of the toning lobe to migrate from a center of the toning lobe toward the main cable body while still providing adequate separation performance of the toning lobe.

29 Claims, 3 Drawing Sheets

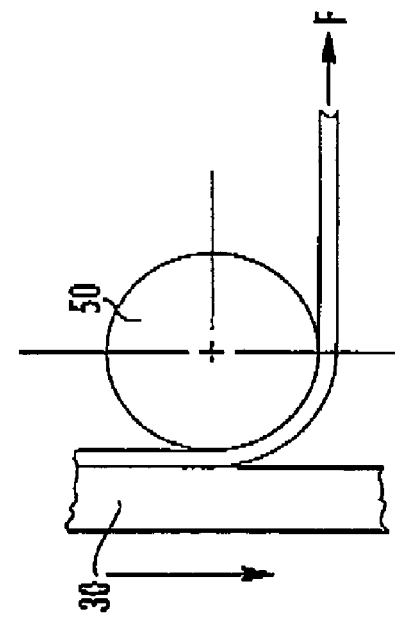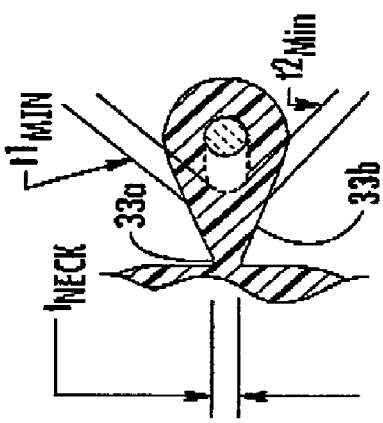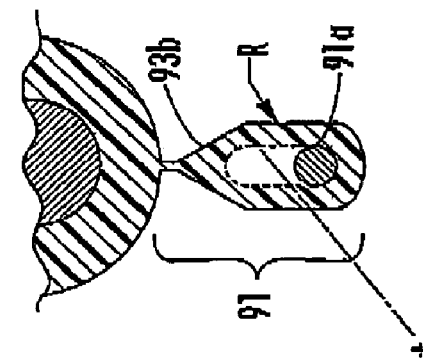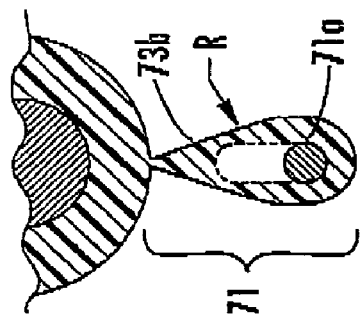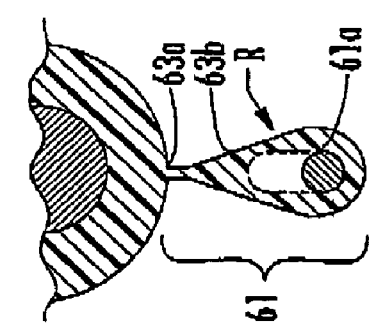

FIBER OPTIC CABLES HAVING A TONING LOBE

FIELD OF THE INVENTION

The present invention relates generally to fiber optic cables suitable for routing optical fiber toward the subscriber such as fiber to the home applications. More particularly, the present invention relates to fiber optic cables having separable toning lobes.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data. On the other hand, an optical waveguide is capable of transmitting an extremely large amount of bandwidth compared with a copper conductor. Moreover, an optical waveguide cable is much lighter and smaller compared with a copper cable having the same bandwidth capacity. Consequently, optical waveguide cables replaced most of the copper cables in long-haul communication network links, thereby providing greater bandwidth capacity for long-haul links. However, many of these long-haul links have bandwidth capacity that is not being used. This is due in part to communication networks that use copper cables for distribution and/or drop links on the subscriber side of the central office. In other words, subscribers have a limited amount of available bandwidth due to the constraints of copper cables in the communication network.

As optical waveguides are deployed deeper into communication networks, subscribers will have access to increased bandwidth. Deployment of optical waveguides toward the subscriber is generally called fiber to the location x (FTTx) applications and includes fiber-to-the-curb (FTTC) and fiber-to-the-home (FTTH) applications. There are certain obstacles that make it challenging and/or expensive to route optical waveguides closer to the subscriber. For instance, making a suitable optical connection between optical waveguides is much more complicated than making an electrical connection between copper wires. Additionally, as the communication network pushes toward subscribers, the communication network requires more connections, which compounds the difficulties of providing optical waveguides to the premises of the subscriber. Thus, routing fiber optic cables towards the subscribers requires a quick and easy solution for streamlining the installation process. Also, on the end of the network closest to the subscriber, smaller cables housing fewer optical fibers are typically used. Such cables have their own set of particular location, installation, termination, and connectorization issues generally not found with long haul cables.

For example, fiber optic cables routed toward the premises of the subscriber may be buried in the yard of the subscriber. Consequently, these buried fiber optic cables are preferably located and marked to prevent damage to the same before the subscriber or others dig. Generally speaking, the craft prefers dielectric cables since they do not have to be grounded and the like. However, dielectric cables are difficult to locate when buried. To address this problem, fiber optic cables have included a toning wire for locating the buried cable. The toning wire is typically a conductor such as a relatively small copper wire that can be used for locating the buried fiber optic cable by sending a signal along the toning wire that can be detected above ground. Specifically, the route of a buried fiber optic cable having a toning wire is found by attaching a tone generator device to an exposed portion of the toning wire so as to generate an electrical toning signal along the toning wire. A detector is then used by the craft to find the buried portions of the toning wire by detecting the toning signal, thereby allowing marking of the cable location.

By way of example, U.S. Patent App. Pub No. 2005/0053342, the disclosure of which is incorporated herein by reference, discloses a preconnectorized fiber optic cable as shown in FIG. 1 having a toning wire disposed in a toning lobe that is connected by a web to a main cable body. The preconnectorized cable includes a plug connector that allows the craft to quickly and reliably optically connect the cable. Before the plug connector can be attached to the end of the cable a relatively short length of the toning lobe must be separated from a portion of the main cable body. It is desirable for the craft to have fiber optic cable designs where the toning lobe is easily separated from the main cable body without damage or leaving irregular surfaces, while still being robust enough to handle bending and/or coiling without unintended separation of the toning lobe.

However, manufacturing fiber optic cables with toning lobes that are easily and reliably separable while still being robust presents certain manufacturing challenges. One challenge for manufacturing at high line speeds is dimension control and shrinkage of the toning lobe because of its relatively small size relative to the main cable body. Another manufacturing challenge is the wearing of the extrusion tip that guides the conductive wire into the extrusion tooling. Simply stated, as the extrusion tip wears the location of the conductive wire within the toning lobe can change, thereby altering the separation performance of the toning lobe. In other words, as the extrusion tip wears (e.g., the guide bore through the tip enlarges) the conductive wire centered within the toning lobe tends to migrate to off-center locations such as toward the main cable body, thereby causing relatively thin walls or portions about the conductive wire 12 that adversely affect separation performance. The conventional wisdom is to replace the worn tooling with new tooling; however, this involves the costs of manufacturing down time and the new tooling. Of course, tooling such as an extrusion tip may be made of harder materials as known to slow the wear, but the harder materials are generally more expensive and difficult to manufacture. Moreover, eventually even the tooling formed from the harder material can wear and allow the conductive wire of the toning lobe to migrate. The present invention addresses the problems associated with the wear of the extrusion tooling that allows the conductive wire of conventional toning lobes to migrate, thereby causing separation performance issues for the conventional toning lobes.

SUMMARY OF THE INVENTION

One aspect of the present invention is directed to a fiber optic cable having a main cable body with at least one optical waveguide and a toning lobe for locating the fiber optic cable. The toning lobe is connected to the main cable body by a web that is frangible, wherein the toning lobe and the web have a generally tear drop shape. The web includes a neck portion adjacent to the main cable body and a web body. The web body generally increases in thickness towards the toning lobe, thereby allowing a conductive wire of the toning lobe to migrate from a center area of the toning lobe toward the main cable body while still providing adequate separation performance of the toning lobe.

Another aspect of the present invention is a fiber optic drop cable having a main cable body with at least one optical waveguide and a toning lobe for locating the fiber optic cable. The toning lobe is connected to the main cable body by a web that is frangible. The web includes a neck portion adjacent to the main cable body and a web body connected to the neck portion at a first end and connected to a main portion of the toning lobe at a second end. The web body has a first side and a second side, wherein the first side is generally tangent to a first point of the toning lobe and the second side is generally tangent to a second point of the toning lobe. The shape of the toning lobe allows a conductive wire of the toning lobe to migrate from a center area of the toning lobe toward the main cable body while still providing adequate separation performance of the toning lobe.

Yet another aspect of the present invention is directed to a fiber optic drop cable having a main cable body with at least one optical waveguide and a toning lobe. The toning lobe is connected to the main cable body by the web that is frangible. The web includes a neck portion adjacent to the main cable body and a web body connected to the neck portion at a first end and connected to a main portion of the toning lobe at a second end. The web body has at least one radius where it joins the main portion of the toning lobe, wherein a center of the at least one radius lies on the toning lobe side of the fiber optic cable. The shape of the toning lobe allows a conductive wire of the toning lobe to migrate from a center area of the toning lobe toward the main cable body while still providing adequate separation performance of the toning lobe.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principals and operations of the invention.

BRIEF DESCRIPTION OF THE DRAWINGS

FIG. 4 is a partial cross-sectional view of the fiber optic cable of FIG. 3 illustrating the details of the toning lobe.

FIG. 5 is a schematic representation of a testing jig used for measuring a separation force of a toning lobe from a fiber optic cable.

FIGS. 6-9 are partial cross-sectional views of a plurality of fiber optic cables showing other variations of toning lobes according to the present invention.

DETAILED DESCRIPTION OF THE INVENTION

Figure 1:
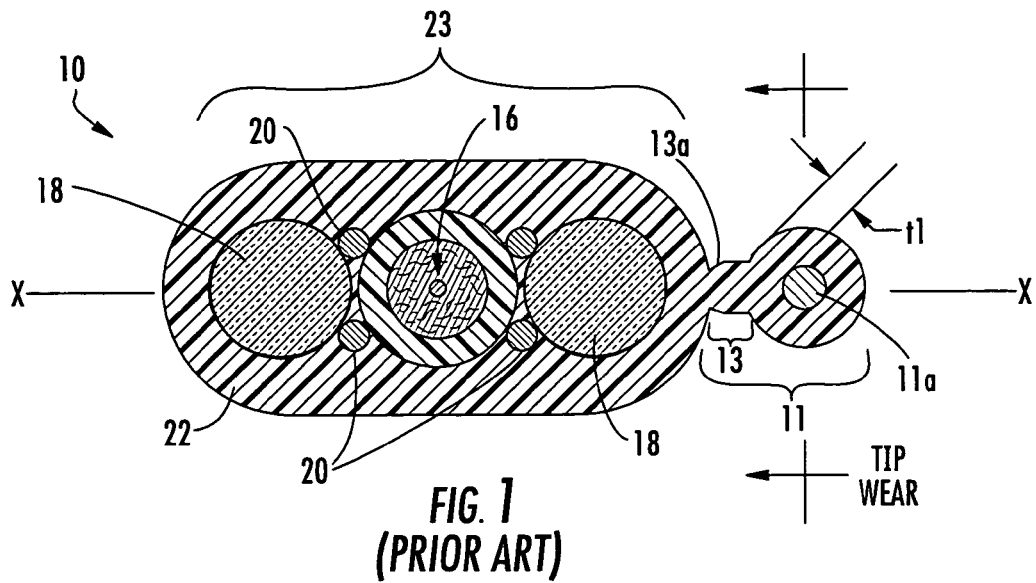
FIG. 1 is a cross-sectional view of a fiber optic cable having a conventional toning lobe with a conductive wire.

Reference will now be made in detail to the present preferred embodiments of the invention, examples of which are illustrated in the accompanying drawings. Whenever possible, the same reference numerals will be used throughout the drawings to refer to the same or like parts. FIG. 1 depicts a fiber optic cable 10 that includes a conventional toning lobe 11 having a web 13 for connecting it to a main cable body 23. Main cable body 23 and toning lobe 11 are formed by a cable jacket 22 that is common to both main cable body 23 and the toning lobe 11 and applied during manufacturing. Web 13 is frangible for separating conventional toning lobe 11 from main cable body 23. More specifically, web 13 is intended for fracturing at a neck portion 13a that is adjacent to main cable body 23, thereby providing a "clean" separation at main cable body 23. In other words, neck portion 13a is intended to tear without damage or leaving irregular surfaces. Conventional toning lobe 11 also includes a conductive wire 11a suitable for carrying a toning signal for locating fiber optic cable 10 when buried. Fiber optic cable 10 also includes an optical transmission component 16, at least one strength component 18, and at least one strength member 20.

As shown in FIG. 1, conductive wire 11a is centered within conventional toning lobe 11 as intended during manufacturing. Generally speaking, the dimensions and geometry for conventional toning lobe 11 are chosen to minimize the amount of polymer used in the cable cross-section while still allowing adequate separation of conventional toning lobe 11 at neck portion 13a. Conventional toning lobe 11 maintains a predetermined thickness $t_1$ of polymer as shown along with a mirror image thickness (not labeled) of polymer on the other side of the X-X axis. Likewise, neck portion 13a has a predetermined minimum thickness (not labeled), thereby allowing separation of conventional toning lobe 11 from main cable body 23 in a desired fashion. Predetermined thickness $t_1$ and its mirror image thickness are points where the stresses will increase during the separation of conventional toning lobe 11 (i.e. during fracturing of neck portion 13a) from main cable body 23. Predetermined thickness $t_1$ and the mirror image thickness are measured at a point of a minimal wall thickness generally towards the main cable body 23 along the line from a center of conductive wire 11a. If conductive wire 11a is concentrically located within conventional toning lobe 11, then predetermined thickness $t_1$ is the difference in radii between the conventional toning lobe 11 and conductive wire 11a.

Figure 2:
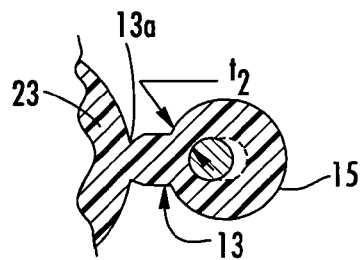
FIG. 2 is a partial cross-sectional view of the conventional fiber optic cable of FIG. 1 showing the migration of the conductive wire from the center of the toning lobe toward the main cable body, thereby changing the intended geometry and separation performance of the conventional toning lobe.

However, conductive wire 11a does not always remain concentrically disposed within conventional toning lobe 11 of fiber optic cable 10. For instance, a concentricity error of conductive wire 11a can occur during the normal manufacture of fiber optic cable 10 due to tooling wear (or other reasons), which can adversely affect the separation/tear performance of conventional toning lobe 11. More specifically, the extrusion tooling tip has a bore that guides conductive wire 11a during the application of cable jacket 22 to ensure the placement of the same within conventional toning lobe 11. As the bore of the extrusion tooling tip wears during normal use (i.e., the bore becomes larger) conductive wire 11a can migrate towards main cable body 23 as shown by the arrows. FIG. 2 depicts a partial cross-sectional view of fiber optic cable 10 after a significant amount of tooling tip wear occurs. As shown, conductive wire 11a has migrated towards main cable body 23 due to the tooling wear that occurred. Consequently, thickness $t_1$ (and the mirror image thickness) of toning lobe 11 as shown in FIG. 1 decreases to a smaller thickness $t_2$ as shown in FIG. 2, which changes the stress concentrations experienced during separation. In other words, the geometry of toning lobe has changed and the stress concentrations experienced at thickness $t_2$ increase, thereby adversely affecting the separation performance of the same. The changes in stress concentrations due to the migration of the conductive wire can result in separation/tear performance issues of toning lobe 11 such as damage, irregular surfaces, and/or other problems that affect the separation characteristics. Stated another way, due to tip wear the conductive wire 11a migrates from its desired location and may have defects or separation degradation such as unintended separation, an exposed conductive wire 11a or exposing conductive wire 11a during separation, and/or a tear that does not occur at neck portion 13a, which leaves an irregular surface. Consequently, the tooling is replaced after it is worn so that the desired geometry and separation performance of conventional toning lobe 11 are restored.

Figure 3:
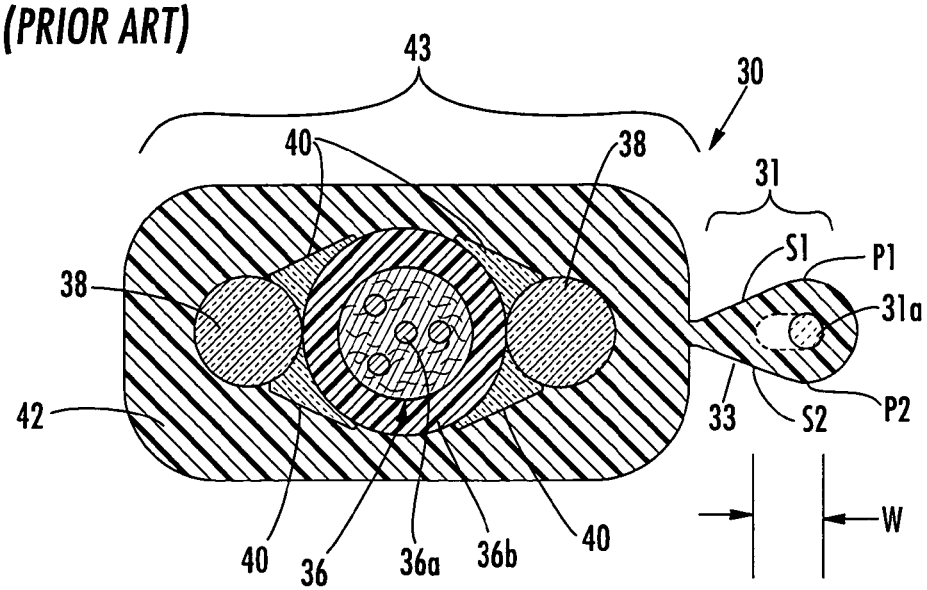
FIG. 3 is a cross-sectional view of an exemplary fiber optic cable having a toning lobe according to the present invention.

Fiber optic cables of the present invention allow the conductive wire of the toning lobe to migrate due to tooling wear (or other reasons) while still providing adequate separation performance of the toning lobe, thereby increasing manufacturing efficiency and reducing manufacturing expense. Generally speaking, toning lobes of the present invention such as a toning lobe 31 (which includes a web 33) as shown in FIG. 3 have a tear drop shape that allows a conductive wire 31a to migrate toward a main cable body 43 due to tip wear (or other reasons) while maintaining the desired separation performance of toning lobe 31. In the present invention, degradation of the separation performance is inhibited even if the conductive wire migrates a significant distance toward the main cable body due to the shape of the toning lobe. In other words, separation performance is maintained since the geometry of the toning lobes of the invention maintain a predetermined thickness of polymer at locations that may experience elevated stress concentrations during separation of the toning lobe even if the conductive wire migrates. Consequently, the tooling that applies the cable jacket has an increased useful life and fewer tooling changes due to wear are required. Furthermore, fiber optic cables of the present invention may have increased manufacturing yield since more variation in the location of the conductive wire of the toning lobe is possible before degradation of the separation/tearing performance of the toning lobe is observed.

As shown, FIG. 3 depicts a fiber optic cable 30 having toning lobe 31 (which includes web 33) according to one embodiment of the present invention. Fiber optic cable 30 is a generally flat cable design depicting toning lobe 31 with a generally tear drop shape that is connected to main cable body 43 by web 33. Web 33 includes a neck portion 33a that is frangible and a web body 33b. Generally speaking, neck portion 33a is disposed generally adjacent to the main cable body 43 and is the portion of the web that is torn (i.e., broken or fractured) during separation of toning lobe 31. In other words, neck portion 33a is intended to have the highest stress concentrations during separation so as to control the location of material fracture during separation of toning lobe 31, thereby creating a "clean" separation (which may have a modest ridge) from the main cable body 43.

Web body 33b is connected to neck portion 33a at a first end and connected to a main portion (not numbered) of toning lobe 31 at a second end. In this embodiment, the main portion of toning lobe 31 is generally round, but other toning lobes can have other shapes for the main portion of the toning lobe such as elliptical, or rectangular, triangular, or diamond shapes having broken corners. As shown, web body 33b of web 33 has a thickness that generally increases as it progresses away from the main cable body 43 and towards toning lobe 31 (i.e. the vertical dimension of web body 33b generally increases and/or is tapered). Stated another way, web body 33b of web 33 has a first side S1 and a second side S2 that respectively intersect the toning lobe 31 at points P1 and P2 that are generally tangent to the respective surfaces (e.g., the north and south positions of the round lobe). Consequently, conductive wire 31a is able to move substantially in the horizontal direction towards main cable body 43 while still providing adequate separation performance of toning lobe 31. As shown, conductive wire 31a can move a distance W from a location that is generally centered within the diameter of toning lobe 31 towards main cable body 43 due to tooling wear, without substantially degrading the separation performance because a minimum thickness $t_{MIN}$ is maintained. In other words, substantial migration of the conductive wire 31a can occur before degradation of the toning lobe separation performance is observed.

In one embodiment of fiber optic cable 30, the minimum thickness of the polymer has a predetermined ratio relative to a neck thickness $t_{NECK}$, thereby maintaining adequate separation performance. FIG. 4 is a partial cross-sectional view of toning lobe 31 showing the dimensions for the predetermined ratio. More specifically, adequate separation of the toning lobe occurs when a first minimum thickness $t1_{MIN}$ and a second minimum thickness $t2_{MIN}$ are related to neck thickness $t_{NECK}$ using the inequality of Equation 1. By way of example, if new tooling produces a toning lobe where $t1_{MIN}$ is about 0.318 millimeters, $t2_{MIN}$ is about 0.330 millimeters, and $t_{NECK}$ is about 0.245 millimeters the ratio is about 2.6, which is greater than 1.5. Thereafter, if the tooling wears so that the conductive wire migrates toward the main cable body and the dimensions change to $t1_{MIN}$ is about 0.271 millimeters, $t2_{MIN}$ is about 0.219 millimeters, and $t_{NECK}$ is about 0.271 millimeters the ratio is about 1.57, which is still greater than (or equal to) 1.5.

$$\frac{t1_{MIN} + t2_{MIN}}{t_{NECK}} \geq 1.5 \qquad (1)$$

The above stated inequality tends to induce stress concentrations in the desired location (across the neck portion), thereby leading to the desired separation performance. Simply stated, the above mentioned dimension ratio inhibit stretching and/or tearing of web material in undesired locations (and/or tearing out of the toning wire from the toning lobe) and instead concentrates the tearing stress at the neck portion, thereby achieving separation/tear characteristics resulting in a reliable and clean separation. However, the separation performance may also be a function of other parameters such as material characteristics. Of course, other suitable ratios and/or combinations of dimensions may be used to arrive at a toning lobe having suitable separation performance using the concepts of the present invention. Moreover, one skilled in the art understands that variations in manufacturing, shrinkage and the like can cause the same cable or other cables manufactured using the same tooling to have other values when measured at different cross-sections along the cable.

Fiber optic cable 30 may be manufactured by operation of pressure extrusion tooling as known in the art, but other methods are possible for manufacturing the cable of FIG. 3 and variations thereof described herein. Cable jacket 42 is formed from a suitable material such as polyethylene or other suitable compound and is supplied under suitable temperature and pressure conditions to the tooling. In one embodiment, cable jacket 42 is a medium density polyethylene (MDPE). Of course, cable jacket 42 may be formed from other suitable thermoplastics, such as a polypropylene, PVC or other flame retardant materials, blends thereof, or the like. By way of example, fiber optic cable 30 has a width of between about 8-12 millimeters and a height of about 4-7 millimeters, but other suitable dimensions are possible. In one embodiment, toning wire 31a is a 24 AWG copper wire having a diameter of about 0.5 millimeters, toning lobe 31 has an outer diameter (not labeled) of about 1.5 millimeters, toning lobe has an overall length of about 2.0 millimeters, and the neck portion has a width of about 0.22 millimeters and a length (along the X-X axis) of about 0.25 millimeters. Having a relatively long length for toning lobe allows a sufficient amount of cooling water to contact the web during manufacture, thereby aiding in generally uniform cooling and inhibiting deformation of the extruded shape. Of course, fiber optic cables of the present invention can have other suitable dimensions for the toning lobe, the conductive wire, and/or the fiber optic cable.

Additionally, variations of fiber optic cable 30 or other cable designs can employ the concepts of the present invention. As depicted, optical transmission component 36 includes a single loose optical waveguide such as an optical fiber(s) 36a disposed within a buffer tube 36b, but other configurations of the optical transmission component are possible. For instance, optical transmission component 36 may include multiple optical fibers or the buffer tube may be eliminated altogether such as in a tubeless configuration. Optical fiber 36a can be any type of optical fiber including, for example, a single-mode, multi-mode or dispersion shifted optical fiber. Likewise, optical transmission component 36 may include tight-buffered fibers, fiber bundles, fiber ribbons, etc. or other optical fiber configurations/groupings. In fiber optic cable 30, buffer tube 36b is sized to contain up to twelve loose optical fibers 36a, but only a single optical fiber is depicted. By way of example, buffer tube 36b has a nominal outer diameter D1 of about 3.0 millimeters and an inner diameter of about 1.8 millimeters, but other suitable diameters such as smaller diameters are possible for other suitable fiber counts. The inner diameter is sized to accommodate a suitable excess fiber length (EFL) for the desired tensile and contraction windows of the intended fiber count. Additionally, buffer tube 36b may also house at least one waterblocking and/or water-swellable substance (not numbered), for example, a gel, thixotropic grease, and/or a water-swellable tape, thread, or yarn for inhibiting the migration of water within buffer tube 36b. Buffer tube 36b may be formed from a suitable polymer such as polypropylene, polyethylene, polyvinyl chloride (PVC), polybutylene terephthalate (PBT) and/or blends thereof.

As shown, fiber optic cable 30 has two strength components 38 and four strength members 40, thereby providing a flexible cable design having the desired tensile rating with a relatively small cross-sectional footprint. Strength members 40 are formed in four locations within fiber optic cable 30. More specifically, strength members 40 are disposed within interstitial spaces between buffer tube 36b and strength components 38 in a compact manner such as a generally triangular shape. The combination of strength components 38 and strength members 40 allows cables of the present invention to withstand the predetermined tensile loads and yet have a suitable overall bending flexibility, while still maintaining a relatively small cross-sectional footprint. Stated another way, fiber optic cable 30 has an improved flexibility compared with another cable having the same tensile rating without the strength members since the GRPs would have to be larger making the cable stiffer and which may also increase the cross-sectional footprint. Consequently, fiber optic cable 30 provides the craft with a cable having the desired tensile strength without surpassing a desired maximum level of cable stiffness, thereby allowing a cable to be bent or coiled to a predetermined radius of curvature as required for installation, slack storage, and the like. However, cables similar to fiber optic cable 30 could eliminate strength members 40 and/or have one or more strength members 40 arranged in a different configuration such as wrapped about the buffer tube.

More specifically, strength components 38 are relatively stiff rods such as glass reinforced plastic (GRPs) that provide the main source of anti-buckling strength and tensile strength, whereas strength members 40 are tensile yarns such as aramid or fiberglass that generally lack anti-buckling strength but provide a significant amount of tensile strength. Strength components 38 may optionally include a water-swellable coating or the like disposed thereon for inhibiting the migration of water along the cable. By way of example, strength components 38 are GRP components having a rod-like shape with a diameter of about 1.6 millimeters and strength members 40 are 800 tex fiberglass yarns, but other suitable materials may be used for either the strength components and/or strength members. In this example, each of the four individual strength members 40 has about 20% of the tensile strength rating of one of the strength components. In other words, the total tensile strength rating of all four strength members 40 is about 80% of one of the strength components 38.

It should be understood however, that each and every characteristic of fiber optic cable 30 is not required to practice the concepts of the present invention, whether related to the toning lobe and web design as described herein or the strength element design, shapes, and/or location as described. It is possible to modify the structure above in various ways to modify their attributes of the resulting cable product. For example, the relative diameters of the strength components and the size and amount of strength member material used could be varied to achieve desired ratings. Additionally, in certain situations, nonsymmetrical designs could be used, for example using only one strength component 38 or differing numbers and or placements of other cable components. Furthermore, cables employing the concepts of the present invention can have other shapes beside the generally flat configuration of fiber optic cable 30, such as main cable bodies that are round, elliptical, tri-lobal, or the like.

The separation force for toning lobes of the present invention is selected to avoid an excessive separation force while inhibiting inadvertent separation during cable bending, coiling, and the like. In one embodiment, the separation force of the toning lobe is between about 10 Newtons and about 50 Newtons for the desired performance and more preferably between about 15 Newtons and about 30 Newtons. The separation force is measured as the toning lobe is pulled away from the main cable body along the X-X axis as depicted by FIG. 1; however, the toning lobe may be separated by pulling in other directions. As shown in FIG. 5, a preferred way of measuring the separation force uses a testing jig (not numbered) that routes the toning lobe portion being pulled about a sheave 50 that rotates. Additionally, the testing jig allows the cable to move in a direction generally perpendicular to an applied force F as it is applied during separation. Thus, the force measured is the separation force applied along the X-X axis.

Of course, other configurations and variations of toning lobes using the concepts of the present invention are possible for allowing the migration of the conductive wire in the toning lobe while providing adequate separation performance. By way of example, FIGS. 6-9 show views of other toning lobes that have a generally tear drop shape according to the present invention that allow migration of the conductive wire. Generally speaking, FIG. 6 depicts a toning lobe 61 that is similar to toning lobe 31 with a generally round shape for the main portion of the toning lobe 61 (i.e., the portion of toning lobe 61 about a conductive wire 61a is round at the bottom), but having a longer neck portion 63a and a longer web body 63b that is tapered so the width generally increases as it progresses toward the toning lobe. Additionally, web body 63b has sides (not numbered) that are generally tangent to the toning lobe (i.e., the radius R at the junction of the respective sides with the toning lobe are generally infinite). FIG. 7 depicts another toning lobe 71 having a generally elliptical shape for the main portion about a conductive wire 71a. More specifically, a major axis of the ellipse is generally aligned with the X-X axis of the fiber optic cable. A web body 73b of toning lobe 71 also has sides (not numbered) that are generally tangent to the toning lobe. FIG. 8 depicts another toning lobe 81 having a generally elliptical shape for the main portion Of the toning lobe about a conductive wire 81a. In this embodiment, a major axis of the ellipse is generally perpendicular to the X-X axis. A web body 83b of toning lobe 81 also has sides (not numbered) that are generally tangent to the toning lobe. Other embodiments of the present invention can have web bodies with a radius at the junction that is less than infinite. For instance, FIG. 9 depicts still another toning lobe 91 having a generally tear drop shape where a web body 93b is tapered so the width generally increases as it progresses toward the toning lobe, but it transitions with a radius R that is less than infinite (i.e., it does not intersect as a tangent line). Radius R of toning lobe 91 has a center that lies on the toning lobe side of the surface (i.e., away from the main cable body). It is recognized, however, that radius of curvature of complex shapes such as radius R often varies, either according to a formula (for example along an ellipse) or otherwise in two or three dimensions. Therefore, radius R discussed herein is not limited to circular, arcuate two-dimensional shapes. Additionally, a main portion of toning lobe 91 has a generally oblong shape like a rectangle having broken corners. Likewise, other shapes for the toning lobe are also possible using the concepts of the present invention.

Figure 10:
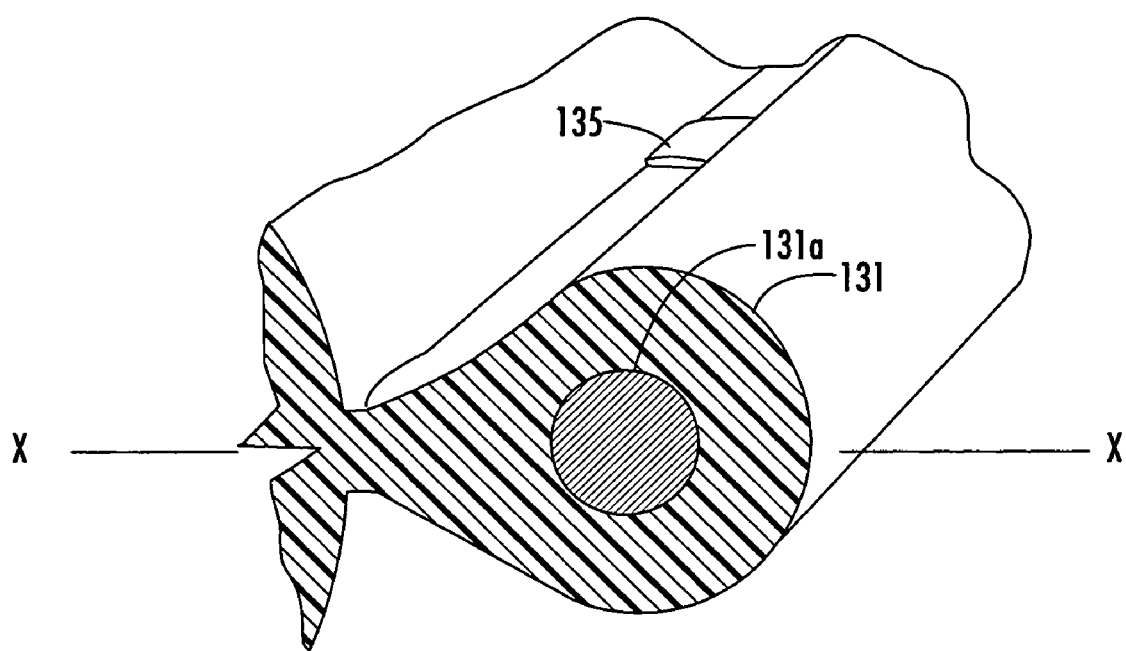
FIG. 10 depicts another variation of a fiber optic cable according to the present invention.

Moreover, FIG. 3 illustrates that the toning lobe 31 is generally symmetrical about the X-X axis; however, the web may optionally be asymmetric about the X-X axis. By way of example, FIG. 10 depicts a portion of a fiber optic cable 100 having a toning lobe 131 with an asymmetric shape about the X-X axis. For instance, the shape of the web body on one side of the X-X axis is different than the other side. Stated another way, a first side of the web body joins the main portion of the toning lobe as a tangent and the second side of the web body joins the main portion with less than a tangent surface. Furthermore, the neck portion and/or web body can optionally include a rip stop 135 of increased material disposed periodically along the length of the web for inhibiting the tear from propagating unless a sufficient force is provided. Rip stop 135 can be formed along the fiber optic cable by pulsating the extrusion at the web or in other suitable ways as known to one skilled in the art.

It will be apparent to those skilled in the art that various modifications and variations can be made to the present invention without departing from the spirit and scope of the invention. For instance, the concepts described herein can be applied to many cable designs, for example, self-supporting, buried, indoor, or indoor/outdoor cable applications. Likewise, flame retardant jacket materials can be selected to achieve plenum, riser, or LSZH flame ratings. Thus it is intended that the present invention cover the modifications and variations of this invention provided they come within the scope of the appended claims and their equivalents.

What is claimed is:

1. A fiber optic cable comprising:
    a main cable body, the main cable body having at least one optical waveguide; and
    a toning lobe, the toning lobe being connected to the main cable body by a web that is frangible, wherein the toning lobe and the web have a generally tear drop shape and the web includes a neck portion adjacent to the main cable body and a web body, wherein the web body generally increases in thickness from the main cable body towards the toning lobe, thereby allowing a conductive wire of the toning lobe to migrate from a center area of the toning lobe toward the main cable body while still providing adequate separation performance of the toning lobe, the toning lobe having a separation force from the main cable body of less than 30 Newtons along an X-X axis.

2. The fiber optic cable of claim 1, further comprising two strength components, wherein the two strength components are disposed on opposite sides of the at least one optical waveguide within the main cable body.

3. The fiber optic cable of claim 1, the web body having a first side and a second side and the first and second sides are generally tangent to a respective surface of the toning lobe.

4. The fiber optic cable of claim 1, wherein the web body has a predetermined radius where it joins a main portion of the toning lobe, wherein a center of the predetermined radius lies on the toning lobe side of the fiber optic cable.

5. The fiber optic cable of claim 1, further including at least one strength component or at least one strength member.

6. The fiber optic cable of claim 1, the web body having a first minimum thickness and a second minimum thickness and the neck portion has a neck thickness, wherein a ratio of the sum of the first minimum thickness and the second minimum thickness divided by the neck thickness is about equal to or greater than 1.5.

7. The fiber optic cable of claim 1, the conductive wire being a copper wire.

8. The fiber optic cable of claim 1, the fiber optic cable having a width of about 12 millimeters or less and a height of about 7 millimeters or less.

9. The fiber optic cable of claim 1, the toning lobe having a separation force from the main cable body between about 10 Newtons and about 30 Newtons along the X-X axis.

10. The fiber optic cable of claim 1, wherein the fiber optic drop cable is flame retardant.

11. The fiber optic cable of claim 1, further including at least one water-swellable component.

12. A fiber optic cable comprising:
    a main cable body, the main cable body having at least one optical waveguide; and
    a toning lobe, the toning lobe being connected to the main cable body by a web that is frangible, wherein the web includes a neck portion adjacent to the main cable body and a web body connected to the neck portion at a first end and connected to a main portion of the toning lobe at a second end, wherein the web body has a first side and a second side, wherein the first side is generally tangent to a first point of the toning lobe and the second side is generally tangent to a second point of the toning lobe and the web body generally decreases in thickness toward the main cable body, thereby allowing a conductive wire of the toning lobe to migrate from a center area of the toning lobe toward the main cable body while still providing adequate separation performance of the toning lobe, the toning lobe having a separation force from the main cable body of less than 30 Newtons along an X-X axis.

13. The fiber optic cable of claim 12, further comprising two strength components, wherein the two strength components are disposed on opposite sides of the at least one optical waveguide within the main cable body.

14. The fiber optic cable of claim 12, wherein the fiber optic drop cable is flame retardant.

15. The fiber optic cable of claim 12, further including at least one water-swellable component.

16. The fiber optic cable of claim 12, further including at least one strength component or at least one strength member.

17. The fiber optic cable of claim 12, the web body having a first minimum thickness and a second minimum thickness and the neck portion has a neck thickness, wherein a ratio of the sum of the first minimum thickness and the second minimum thickness divided by the neck thickness is about equal to or greater than 1.5.

18. The fiber optic cable of claim 12, the conductive wire being a copper wire.

19. The fiber optic cable of claim 12, the fiber optic cable having a width of about 12 millimeters or less and a height of about 7 millimeters or less.

20. The fiber optic cable of claim 12, the toning lobe having a separation force from the main cable body between about 10 Newtons and about 30 Newtons along the X-X axis.

21. A fiber optic cable comprising:
   a main cable body, the main cable body having at least one optical waveguide; and
   a toning lobe, the toning lobe being connected to the main cable body by a web that is frangible, wherein the web includes a neck portion adjacent to the main cable body and a web body connected to the neck portion at a first end and connected to a main portion of the toning lobe at a second end wherein the web body generally increases in thickness from first end to the second end, the web body having at least one radius where it joins the main portion of the toning lobe, wherein a center of the at least one radius lies on the toning lobe side of the fiber optic cable, thereby allowing a conductive wire of the toning lobe to migrate from a center area of the toning lobe toward the main cable body while still providing adequate separation performance of the toning lobe, the toning lobe having a separation force from the main cable body of less than 30 Newtons along an X-X axis.

22. The fiber optic cable of claim 21, further comprising two strength components, wherein the two strength components are disposed on opposite sides of the at least one optical waveguide within the main cable body.

23. The fiber optic cable of claim 21, wherein the fiber optic drop cable is flame retardant.

24. The fiber optic cable of claim 21, further including at least one water-swellable component.

25. The fiber optic cable of claim 21, further including at least one strength component or at least one strength member.

26. The fiber optic cable of claim 21, the web body having a first minimum thickness and a second minimum thickness and the neck portion has a neck thickness, wherein a ratio of the sum of the first minimum thickness and the second minimum thickness divided by the neck thickness is about equal to or greater than 1.5.

27. The fiber optic cable of claim 21, the conductive wire being a copper wire.

28. The fiber optic cable of claim 21, the fiber optic cable having a width of about 12 millimeters or less and a height of about 7 millimeters or less.

29. The fiber optic cable of claim 21, the toning lobe having a separation force from the main cable body between about 10 Newtons and about 30 Newtons along the X-X axis.

\* \* \* \* \*